(12) United States Patent
Traechtler et al.

(10) Patent No.: US 7,149,614 B2
(45) Date of Patent: Dec. 12, 2006

(54) METHOD AND DEVICE FOR IDENTIFYING AND ELIMINATING THE RISK OF ROLLOVER

(75) Inventors: Ansgar Traechtler, Ditzingen-Hirschlanden (DE); Frank Leibeling, Moeglingen (DE); Marco Metzger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 10/484,411

(22) PCT Filed: Jul. 11, 2002

(86) PCT No.: PCT/DE02/02536

§ 371 (c)(1),
(2), (4) Date: Jul. 27, 2004

(87) PCT Pub. No.: WO03/008242

PCT Pub. Date: Jan. 30, 2003

(65) Prior Publication Data

US 2004/0254703 A1  Dec. 16, 2004

(30) Foreign Application Priority Data

Jul. 18, 2001  (DE) .............................. 101 35 020

(51) Int. Cl.
*B60G 23/00* (2006.01)
*B62C 3/00* (2006.01)

(52) U.S. Cl. .................... 701/38; 701/37; 701/72; 701/82; 701/84; 701/90; 180/197

(58) Field of Classification Search ................ 701/70, 701/72, 37, 38, 73, 78, 82, 83, 84, 90, 91; 180/197
See application file for complete search history.

(56) References Cited

U.S. PATENT DOCUMENTS

| | | | |
|---|---|---|---|
| 6,178,368 B1 | 1/2001 | Otake | 701/70 |
| 6,311,111 B1 | 10/2001 | Leimbach et al. | 701/38 |
| 6,321,141 B1 | 11/2001 | Leimbach | 701/1 |
| 6,384,719 B1 | 5/2002 | Dieckmann | 340/440 |
| 6,463,379 B1 | 10/2002 | Kohler et al. | 701/84 |
| 6,823,244 B1 * | 11/2004 | Breed | 701/29 |

FOREIGN PATENT DOCUMENTS

| | | |
|---|---|---|
| DE | 197 51 839 | 5/1999 |
| DE | 197 51 867 | 5/1999 |
| DE | 197 51 891 | 5/1999 |
| DE | 199 07 633 | 10/1999 |
| DE | 198 30 189 | 11/1999 |
| DE | 198 44 912 | 4/2000 |
| DE | 199 58 221 | 6/2001 |

\* cited by examiner

*Primary Examiner*—Gertrude A. Jeanglaude
(74) *Attorney, Agent, or Firm*—Kenyon & Kenyon LLP

(57) ABSTRACT

A device and the method are for the recognition and rectification of the danger of rollover of a vehicle, outfitted with a regulating system, about a vehicle axis oriented in the longitudinal direction of the vehicle. The regulating system controls actuators using its output signals in accordance with the output signal values. A variable describing the transverse dynamics of the vehicle is determined for the recognition of the danger of a rollover. This variable describing the transverse dynamics of the vehicle is compared to at least one characteristic value, e.g., a threshold value. In the case in which the variable describing the transverse dynamics of the vehicle is greater than, or equal to the characteristic value, the number of all possible combinations of output signal values that may be supplied to the actuators by the regulating system for stability regulation is restricted.

9 Claims, 5 Drawing Sheets

METHOD AND DEVICE FOR IDENTIFYING AND ELIMINATING THE RISK OF ROLLOVER

FIELD OF THE INVENTION

The present invention relates to a method and a device for stabilizing a vehicle, e.g., and for avoiding rollover of a vehicle about a vehicle axis oriented in the longitudinal direction of the vehicle.

BACKGROUND INFORMATION

Vehicles having a high center of gravity and a soft suspension, such as SUVs (sport utility vehicles) or vehicles designed to be suitable for both offroad and onroad purposes, may lose stability with respect to turning about a vehicle axis oriented in the longitudinal direction of the vehicle during driving maneuvers such as lane change, circular driving or cornering at increasing steering angle. This is particularly the case if the height of the center of gravity of the vehicle can vary a great deal, as, for example, when driving with and without a roof load, or in the case of a vehicle having a level control system. The standard measures of a vehicle dynamics control system such as ESP are not able to prevent this in all cases, since they regulate primarily the transverse dynamics with respect to rotation about the vertical axis of the vehicle.

German Published Patent Application No. 199 07 633 refers, in its introduction, to a method for stabilizing a vehicle, and for avoiding the rollover of a vehicle about a vehicle axis oriented in the longitudinal direction of the vehicle in which a variable is ascertained that describes the transverse dynamics of the vehicle. This variable is compared to at least one characteristic value, such as a threshold value for this variable. In the case where the variable describing the transverse dynamics is greater than, or equal to the characteristic value, the speed of the vehicle is reduced to a specifiable speed value or held to a specifiable speed value, at least by brake applications at at least one wheel and/or by engine and/or retarder interventions.

German Published Patent Application No. 197 51 891 refers to another method and device for stabilizing a vehicle when there is a rollover tendency in which at at least one wheel, a variable quantitatively describing the performance characteristics of the respective wheel is ascertained. At least as a function of the variable ascertained for the at least one wheel, which quantitatively describes the performance characteristics of that wheel, it is determined whether there exists a tendency to rollover for the vehicle about a vehicle axis oriented in the longitudinal direction of the vehicle. If a rollover tendency exists, stabilizing brake applications are carried out at least at at least one wheel of the vehicle.

German Published Patent Application No. 198 44 912 refers to a device and method for influencing the propulsion of a vehicle in which the device has a first arrangement, via which a transverse acceleration variable is recorded describing the transverse acceleration acting on the vehicle. The device also includes a second arrangement by which a variable that describes the behavior over time of the transverse acceleration variable is ascertained. The device also includes a third arrangement via which an intervention variable is ascertained as a function of the transverse acceleration variable and the variable which describes the behavior over time of the transverse acceleration variable. The device also includes fourth arrangement by which engine interventions for influencing propulsion are conducted, the engine interventions being undertaken as a function of the intervention variable.

SUMMARY

The present invention provides a method and device for avoiding rollover of a vehicle about a vehicle axis oriented in the longitudinal direction of the vehicle. An increased danger of rollover may exist, for example, during rapid lane change, characterized by a large change over time in the transverse acceleration, approximate circular driving, characterized by a transverse acceleration having a nearly constant quantity and a very small change over time in the quantity of transverse acceleration, and in cornering.

According to an example embodiment of the present invention, a variable is ascertained that describes the transverse dynamics of the vehicle. This variable is compared to at least one characteristic value, such as a threshold value. In this context, the vehicle is equipped with a regulating system that outputs signals that drive actuators. In the case in which the variable describing the transverse dynamics of the vehicle is greater than, or equal to the characteristic value, the number of all possible combinations of output signal values that can be released to the actuators from the regulating system for the stability regulation is restricted. The restriction of these interventions is carried out by the ROP controller which may be implemented as a part of the software of the regulating system. This restriction may enable the de-activation of those regulating interventions which may lead to a further increase of the danger of rollover.

In this context, the driving dynamics regulating system ESP (electronic stability program) may be implemented as the regulating system in one particular embodiment of the present invention. This driving dynamics regulating system regulates the transverse dynamics of the vehicle with respect to rotation about the vertical axis by regulation of the individual wheel rotational speeds. The regulation of the wheel rotational speeds is based on a comparison between a measured or calculated actual yaw rate, as well as a desired setpoint yaw rate. The ROP controller may be implemented as a sub-module within the ESP.

The ABS (anti-blocking system) can also be utilized to provide some or all of the functionality of the regulating system. An ABS system is understood herein to mean a regulating device in the braking system which prevents the locking of the wheels during braking, and as a result maintains the steerability and the driving stability.

An ASR (antilock brake system) may also be utilized to provide some or all of the functionality of the regulating system. An ASR system is understood herein to mean a regulating device which prevents spin of the wheels during starting and accelerations, and thus ensures driving stability.

An example embodiment of the present invention may make possible a prioritization of regulating interventions. For example, using an ESP regulating system, during a driving state without a heightened danger of rollover about the vehicle's longitudinal axis, the regulation of the driving dynamics about the vehicle's vertical axis has priority. However, as soon as the variable characterizing the transverse dynamics of the vehicle is greater than, or equal to, the characteristic value, the number of all possible combinations of output signal values that may be released to the actuators by the regulating system for the stability regulation is restricted. Consequently, the driving dynamics regulation with respect to rotation about the vertical axis has only restricted priority left, since the driving dynamics regulating system is prevented from undertaking interventions which further increase, or do not decrease, a detected rollover danger.

The restriction of the number of all possible combinations of output signal values of the output signals of the regulating system that are permitted to be released to the actuators may thus lead to the execution of at least one feasible intervention by the regulating system for the stability regulation of the vehicle performance.

In this event, an intervention appropriate for normal regulation objectives of the regulation system may be prohibited. In this context, the "normal regulation objectives" are understood to mean the regulation objectives set by the regulating system when there exists no danger of a rollover about an axis of the vehicle oriented in the longitudinal direction. Thus, using the example of an ESP driving dynamics regulating system, an optimal regulation of the transverse dynamics with respect to a rotation about the vertical axis of the vehicle may not occur in the event that a threatening rollover danger is detected. Rectification of the rollover danger has priority.

At the same time, by the prevention of at least one possible intervention in the performance of the vehicle, operation scenarios encumbered with disadvantages may also be excluded. Such a disadvantageous operation scenario may occur, for example, when, during ASR operation, the brake works against the engine, which can lead to increased wear of the brake linings.

In the case in which the variable describing the transverse dynamics of the vehicle is greater than, or equal to the characteristic value, an intervention may be undertaken with an intensity that increases in correspondence with an increase in the variable describing the transverse dynamics of the vehicle in such a way that at least three intensity stages of the intervention may be distinguished.

An example embodiment of the present invention may be advantageously applied when a driving dynamics regulating system (ESP) is involved as the regulating system. The sensors present in the driving dynamics regulating system, particularly the transverse acceleration sensor, may be used in concert for the detection of rollover danger. Consequently, in this case, the method according to an example embodiment of the present invention may be implemented as a subfunction of the driving dynamics regulating system.

To ascertain the variable describing the transverse dynamics, the transverse acceleration and the change over time of the transverse acceleration may be used. The use of the change over time of the transverse acceleration permits the detection of very highly dynamic processes, such as rapid lane changes.

There are cases in which the variable describing the transverse dynamics for a brief time exceeds the characteristic value, but it immediately dies down again to a noncritical value. A low-pass filter may be employed suitable for filtering out such events.

Therefore, a low-pass filter may be used in the determination of the variable describing the transverse dynamics.

An example embodiment of the present invention may also be employed when a reduction of the maximum possible engine torque takes place along with an increase in the variable (KoKipp) describing the transverse dynamics.

To ascertain the variable describing the transverse dynamics, the compression travel of the wheels may also be used as an alternative possibility. In this context, "compression travel" is understood to mean the relative distances between the wheel units and the automotive body. A variable corresponding to the transverse acceleration may be calculated from the compression travel. Thus, there are two transverse acceleration values available: the value measured by the transverse acceleration sensor and the value calculated from the compression travel. This permits an alternative analysis of the two values or a combination of the two values. In particular, the application range of an example embodiment of the present invention may be widened in that it may be used both in a vehicle equipped with a transverse acceleration sensor and in a vehicle equipped with measuring devices for measuring the compression travel.

If the vehicle is equipped with a level control system, the compression travel measured by this system may be used, and made available to the regulating system via the CAN (controller area network).

Understeering vehicle performance occurs when, at increasing transverse acceleration, the slip angle at the front axle is increasing more greatly than the slip angle at the rear axle. From a visual point of view this means that the vehicle follows a track curve having a smaller radius of curvature than intended by the driver. As one essential measure against understeering, the driving dynamics regulating system brakes the rear wheel that is on the inside of the curve.

For the case in which the variable describing the transverse dynamics is greater than, or equal to the characteristic value, at least one of the following interventions in the vehicle performance may be restricted from use by the driving dynamics regulating system:

Understeered: Danger of rollover occurs frequently when the vehicle is in an understeered condition. Then the driving dynamics regulating system, depending on the situation, is prevented from employing any interventions against understeering (ROP controller=rollover prevention controller), for example, the braking of the rear wheel on the inside of the curve. Such preventions against understeering may be employed only when the transverse acceleration of the vehicle exceeds a threshold value. Because of the restriction of interventions against understeering, there is no further increase in the sideslip angle, and the rollover danger is clearly reduced.

Brake application during high speed and high transverse acceleration: rollover danger can exist if the brakes are applied at high speed and great transverse acceleration. In this driving condition, the vehicle dynamics regulating system is prevented from reducing the braking force at the front wheel on the outside of the curve. This leads to a reduced transverse acceleration and a reduction in the rollover danger. This functionality of the ROP controller is designated as "debraking" logic.

ASR brake applications at high transverse acceleration: increased rollover danger exists even in case of ASR brake applications at the front wheel on the inside of the curve, at high transverse acceleration. There, an increase in lateral force has to be avoided. The driving dynamics regulating system is then prevented from making brake applications for the purpose of reducing the drive slip at the front wheel on the inside of the curve. This can also be understood quite graphically: the driver operates the gas pedal and the front wheel on the inside of the curve slips. In this case, when a rollover tendency is detected, the ROP controller permits the front wheel on the inside of the curve to continue spinning.

DETAILED DESCRIPTION

The present invention relates to a device and a method for detecting and suppressing the danger of rollover.

Figure 1:
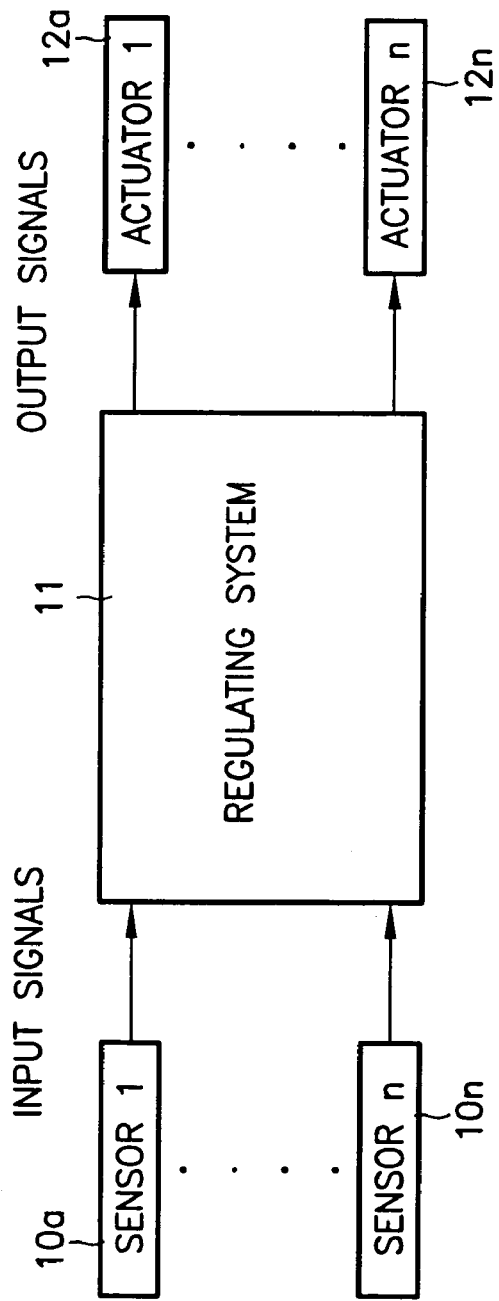
FIG. 1 shows a schematic diagram of a regulating system having input signals delivered by sensors and output signals through which actuators are controlled.

Blocks $10a, \ldots, 10n$ of FIG. 1 represent sensors whose output signals are used as the input signals of a regulating system 11. This regulating system 11, in turn, generates output signals which can be used for controlling the most varied actuators $12a, \ldots, 12n$. Instead of, or in addition to the actuators, other systems, such as driver information systems, may also be controlled by the output signals of regulating system 11.

Figure 2:
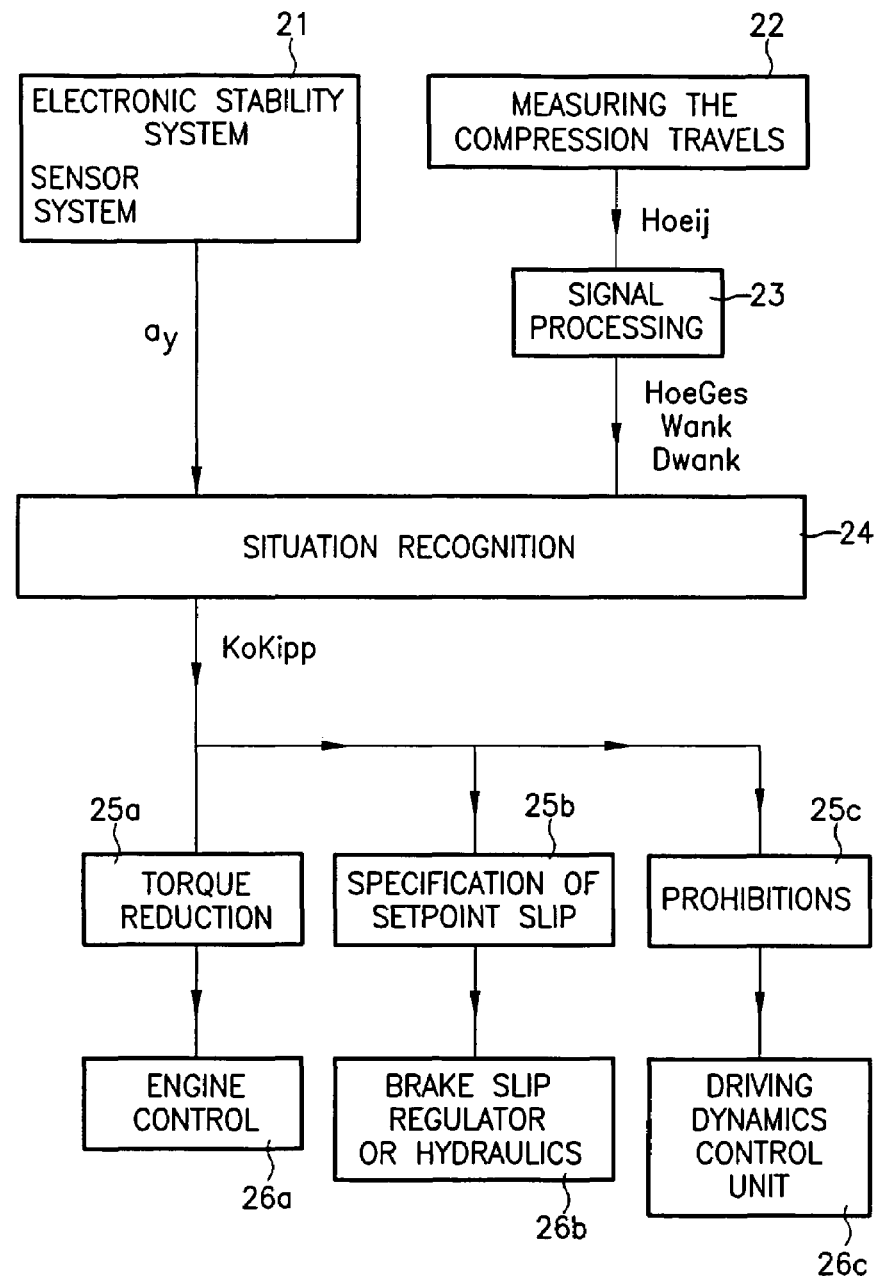
FIG. 2 shows a block diagram of an example embodiment of a regulating system according to the present invention.

FIG. 2 illustrates an example embodiment of a regulating system according to the present invention.

The input signals are delivered, in this context, by signal sources 21 and/or 22. Signal source 21 includes a transverse acceleration sensor, and signal source 22 includes four measuring devices which record the compression travels of the wheels. Signal source 22 may also include only two measuring devices for recording compression travel. In this case, the compression travel is recorded only at the front wheels or at the rear wheels.

Signal source 21 delivers the measured transverse acceleration $a_y$. Signal source 22 delivers four output signals, which are marked as Hoeij in FIG. 2. In this context, ij characterizes the appropriate wheel. This will be discussed in more detail below.

Signals Hoeij are supplied to a block 23, in which these signals are processed. In block 23, from these variables, further variables HoeGes, Wank and Dwank are calculated and made available as output signals. HoeGes is a measure of the height of the center of gravity of the vehicle, Wank is a measure of the roll velocity, Dwank is a measure of the change over time of the roll velocity. For purposes of explanation, the meaning of signals Hoeij, HoeGes, Wank and Dwank are explained later, in connection with FIG. 3.

Scenario recognition takes place in block 24. In this block, a rollover indicator KoKipp is determined from the input signals. This rollover indicator represents a measure of the danger of rollover of a vehicle about its longitudinal axis. In an example embodiment, KoKipp has a minimum value of 0 and a maximum value of 1. In this context the value 0 means that there is no danger of a rollover, and the value 1 means a great danger of rollover.

The output signals of block 24 are fed to blocks 25a, 25b and 25c. In these blocks countermeasures are taken in case of a detected rollover danger. In this context, the following three measures are available.

In block 25a, a torque reduction is determined as countermeasure against the danger of rollover. This torque reduction is passed on to engine control 26a.

In block 25b setpoint slip values are calculated. These setpoint slip values are passed on to brake slip controller 26b or other control units of hydraulic systems.

In block 25c restrictions are activated. By these restrictions, the number of possible measures that can be carried out during driving dynamics regulation is restricted. The restriction process is discussed in greater detail below. The output signals of block 25c are therefore fed to a driving dynamics control unit 26c.

It is noted that all three measures need not be carried out simultaneously.

Figure 3:
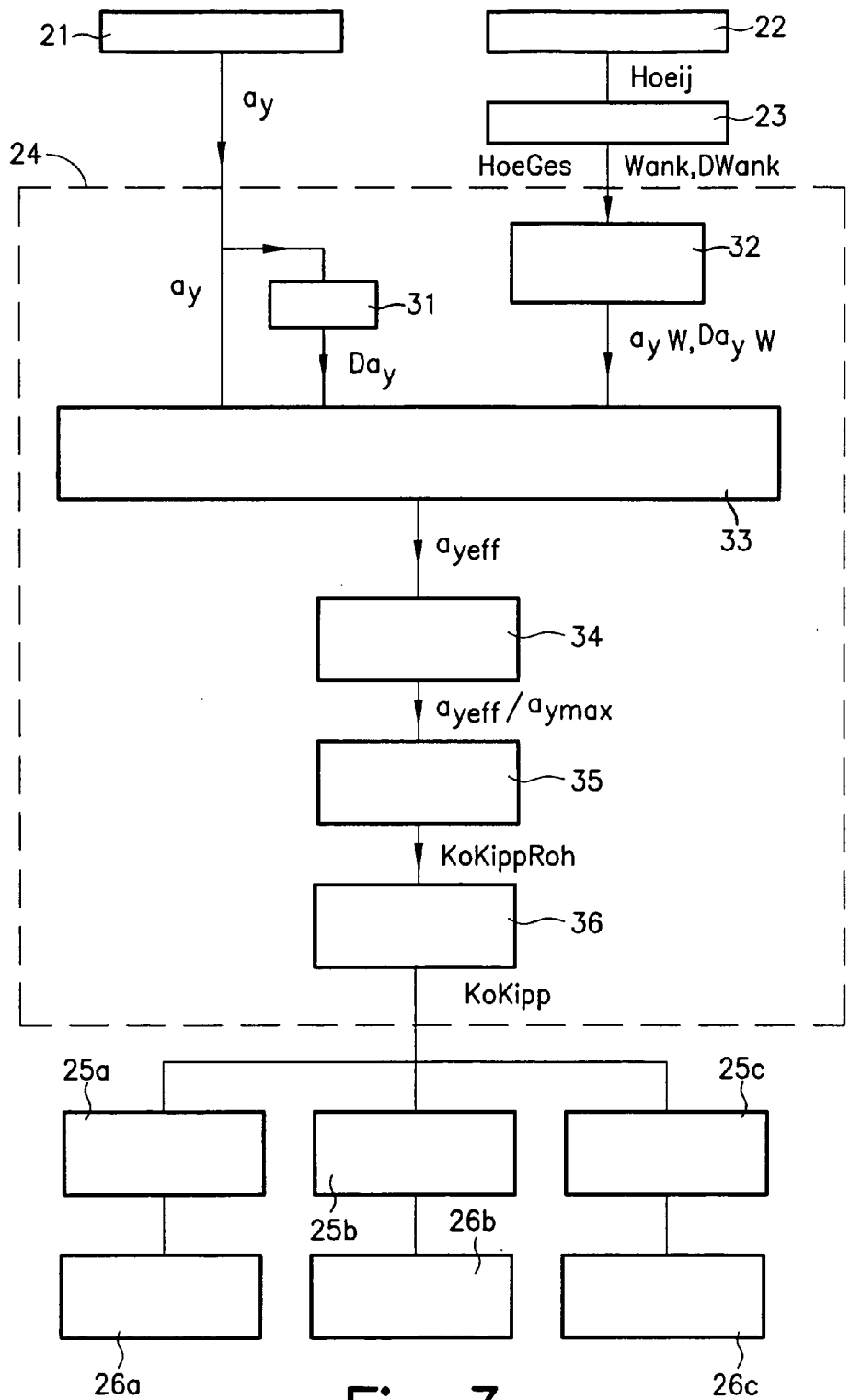
FIG. 3 shows a block diagram a sequence of a response to a scenario recognition according to an example embodiment of the present invention.

FIG. 3 shows a block diagram of an example sequence of the method for the detection of the danger of rollover. Signals $a_y$, HoeGes, Wank and Dwank are ready as input signals.

In this context, block 24, which is drawn with a dashed line, corresponds to those parts which may be employed in scenario recognition shown in FIG. 2.

In block 31, the change per unit of time of the measured transverse acceleration ay is determined. This change per unit of time is denoted as $Da_y$. Henceforth, the change per unit of time is designated as the differential coefficient.

In block 32 signals $a_{y,W}$ and $Da_{yw}$ are generated from input signals HoeGes, Wank and Dwank. The subscript "W" here indicates that variables derived from the filtered roll angle, instead of measured variables, are involved, which correspond to transverse acceleration $a_y$ and the differential coefficient $Da_y$ of the transverse acceleration.

Consequently, input signals $a_y$, $Da_y$, $a_{yw}$ and $Da_{yw}$ are available to block 33. In this context, both $a_y$ and $a_{yw}$ describe the transverse acceleration. $Da_y$ and $Da_{yw}$ describe the corresponding differential quotient, that is, the changes per unit of time. Therefore, for the further processing in block 33, either signals and $Da_y$ or $a_{yw}$ and $Da_{yw}$ or both together may be used. In the following, it is assumed that only signals $a_y$ and $Da_y$ are processed further. However, all statements made with respect to signals $a_y$ and $Da_y$ also apply to signals $a_{yw}$ and $Da_{yw}$ or to further signals which proceed in any way from the four named signals, and correspond to a transverse acceleration and its differential coefficient.

As the output signal, block 33 delivers parameter $a_{yeff}$. Is has already been mentioned that some driving maneuvers can lead to an increased danger of rollover. In the case of these maneuvers, there is typically either a large transverse acceleration and/or a large derivative with respect to time of the absolute quantity of the transverse acceleration. These situations may be considered in common in a parameter $a_{yeff}$ by weighted addition. Parameter $a_{yeff}$ is therefore determined as follows:

$a_{yeff}=|a_y|+c*|Da_y|$ at increasing transverse acceleration, i.e. $a_y*Da_y>0$, and $a_{yeff}=|a_y|$ at non-increasing transverse acceleration, i.e. $a_y*Da_y<0$, or $a_y*Da_y=0$ In this context, $Da_y$ characterizes the differential coefficient of the transverse acceleration. In the case of increasing transverse acceleration, the consideration of $Da_y$ is therefore necessary, since the danger of a rollover can be detected in time. In the case of a diminishing transverse acceleration, the consideration of $Da_y$ is not required.

The coefficient c may be a constant which is ascertained experimentally in the application phase. By the driving of lane changes, c may then be selected in such a way that, even in response to instantaneous maneuvers, the rollover indicator KoKipp responds in time. However, it is also possible to determine c from a characteristics curve. In this characteristics curve, c is plotted on the ordinate, and on the abscissa is plotted the difference between the unfiltered transverse acceleration and the filtered transverse acceleration. This difference is a parameter for the dynamics of the driving maneuver. In the case of highly dynamic driving maneuvers, such as rapid lane change of the vehicle, the difference between the unfiltered transverse acceleration and the filtered transverse acceleration is great and consequently a greater c is selected. In the case of low dynamic driving maneuvers, such as circular-course driving at constant speed of the vehicle, the difference between the unfiltered transverse acceleration and the filtered transverse acceleration is small, and consequently a smaller c is selected.

In block 34, output signal $a_{yeff}/a_{ymax}$ is determined from input signal $a_{yeff}$. For this purpose, in the application phase, at stationary circular-course driving, it is ascertained experimentally at what transverse acceleration $a_{ymax}$ the vehicle threatens to roll over. This value is a function of the height of the center of gravity of the vehicle. If further data concerning the height of the center of gravity is available, for example, by the evaluation of the compression travel, then $a_{ymax}$ can be correspondingly corrected in dependence on the scenario. Otherwise, the threshold is held so low that all decisive situations such as the loading or the set driving level remain safely manageable. Furthermore, a correction by other available signals, such as driving speed, may also be performed. The constant or situation-dependent value $a_{ymax}$ represents a threshold for $a_{yeff}$ which may not be exceeded.

From the ratio $a_{yeff}$ to $a_{ymax}$ an unfiltered rollover indicator KoKippRoh is calculated in block 35, which tells how great the rollover danger is.

Figure 4:
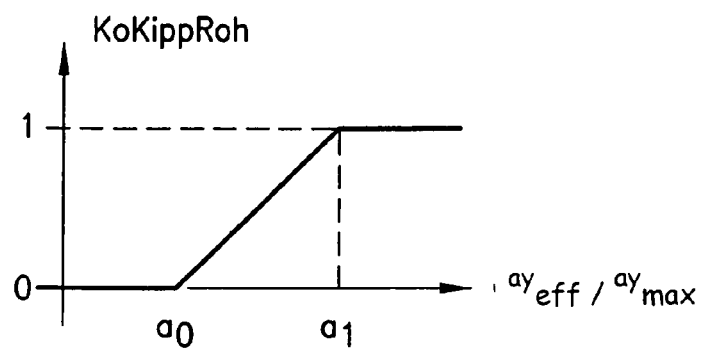
FIG. 4 shows a graph of an unfiltered rollover indicator KoKippRoh versus a transverse acceleration parameter.

FIG. 4 shows a graph of an example characteristics curve by which the unfiltered rollover indicator KoKippRoh may be calculated. There, KoKippRoh is plotted as a function of the ratio $a_{yeff}/a_{ymax}$. A continuous, piecewise linear function is involved here, which assumes the value 0 for $a_{yeff}/a_{ymax}<a_0$, which assumes the value 1 for $a_{yeff}/a_{ymax}>a_1$, and in between it grows linearly from 0 to 1. In this context, KoKippRoh=0 means no rollover danger, KoKippRoh=1 means great rollover danger. Via the constants $a_0$ and $a_1$, the response threshold and sensitivity of the rollover indicator may be adjusted. Of course, other characteristics curve patterns than the one shown in FIG. 4 are possible.

The unfiltered rollover indicator KoKippRoh goes into block 36 as an input signal. There it is filtered, at decreasing values of KoKippRoh, using a low-pass filter of the first order. In the case of an increasing transverse acceleration, a rapid filtering can be used for this. In the case of a decreasing transverse acceleration, a filtering having a variable filter coefficient can be used for this. This corresponds to the use of a characteristics curve. This low-pass filtering permits masking out short-term spikes of KoKippRoh. By these measures, rollover indicator KoKipp is obtained in block 36 from unfiltered rollover indicator KoKippRoh.

Figure 5:
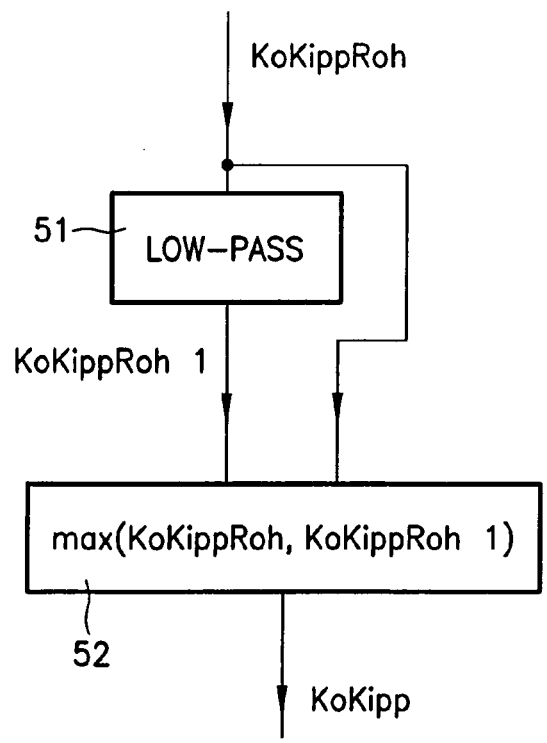
FIG. 5 shows a flow diagram an example embodiment of the determination of a filtered rollover indicator KoKipp from unfiltered rollover indicator KoKippRoh for the case of decreasing values of KoKippRoh.

FIG. 5 shows an example embodiment of block 36 in FIG. 3. In a flow diagram, the determination of filtered rollover indicator KoKipp from unfiltered rollover indicator KoKippRoh is shown for the case of decreasing values of KoKippRoh. In the case where they are decreasing, the ascertained values KoKippRoh are fed as input signals to block 51, which may be implemented as a low-pass filter of the first order. Block 51 generates as output signal filtered signal KoKippRoh1, which besides signal KoKippRoh is conducted to a block 52. There, the maximum of the values of the two signals KoKippRoh and KoKippRoh1 is determined. KoKipp is assigned the maximum value of the two signals.

Analogously to unfiltered rollover indicator KoKippRoh, rollover indicator KoKipp, in an example embodiment, also assumes values between 0 and 1. In this context, KoKipp=0 means no rollover danger, KoKipp=1 means great rollover danger.

As a function of the determined value of KoKipp, two completely different kinds of ROP controller interventions are carried out in parallel: continuous controller interventions as well as discrete prohibitions.

Two kinds of continuous controller interventions take place (blocks 25a, 25b, 26a, 26b):

1. In the drive case, for KoKipp>0, the drive torque is increasingly reduced. This takes place in the usual way in the driving dynamics regulation (ESP) via drive slip regulation, in that the drive setpoint slip (for ASR) is reduced proportionally to the value of KoKipp.

2. For freewheeling and the brake case (and also if the above-mentioned first continuous measure is not sufficient in the drive case), if KoKipp exceeds a threshold, the front wheel on the outside of the curve is brought into brake slip, so that the vehicle may slip away sideways. This occurs via a great brake slip input at the front wheel on the outside of the curve which is connected with an active pressure buildup. This kind of intervention is also a component of ESP.

These continuous controller interventions set in at a first threshold value of KoKipp, and are carried out, at a growing value of KoKipp, with an increasing intensity. Beginning at a second (and larger) threshold value of KoKipp they are carried out with maximum intensity.

Besides these continuous interventions, there are 3 discrete prohibitions for the controller. For these, blocks 25c and 26c are employed:

1. Depending on the scenario, all interventions against understeering are restricted to the ROP controller (ROP controller=rollover prevention controller). The restriction of interventions against understeering may become effective only when the transverse acceleration of the vehicle exceeds a threshold value. Because of the prohibition of interventions against understeering, there is no further increase in the sideslip angle, and the rollover danger is clearly reduced.

2. The controller is prevented from reducing the braking force at the front wheel at the outside of the curve. Naturally, this is only possible if this wheel is being braked at all. This leads to a reduced transverse acceleration and a reduction in the rollover danger. This functionality of the ROP controller is designated as "debraking logic".

3. The driving dynamics regulating system is prevented from making brake applications for the purpose of reducing the drive slip at the front wheel on the inside of the curve. This can also be understood graphically: the driver operates the gas pedal and the front wheel on the inside of the curve slips. In this case, when a rollover tendency is detected, the ROP controller permits the front wheel on the inside of the curve to continue spinning.

The discrete restrictions 2 and 3 become effective for the controller immediately, as soon as the ROP logic is activated, i.e., as soon as KoKipp has exceeded a value KoKippGrenz. In an example embodiment, the value 0 is selected for KoKippGrenz.

According to an example embodiment, discrete restriction 1 becomes effective only if, besides the activation of the ROP logic, a second condition or additional conditions are satisfied. As mentioned above, such a further condition may be that the transverse acceleration is exceeding a threshold value. This implies that the first discrete restriction may come into force only at a later point in time than the second and third discrete prohibitions. In response to rollover danger detected as minor, the second and third restrictions for the rectification of the danger of a rollover may be sufficient.

In addition to the scenario recognition that occurs by evaluating the output signals delivered by transverse acceleration sensor 10, there is, alternatively or in addition, the possibility of scenario recognition by examining the compression travel of the wheels. In the following, the compression travel Hoeij of the wheels is more closely specified as HoeVL, HoeVR, HoeHL and HoeHR, where HoeVL=compression travel at the left front wheel,
HoeVR=compression travel at the right front wheel,
HoeHL=compression travel at the left rear wheel and
HoeHR=compression travel at the right rear wheel.

These variables are often measured in connection with a level regulating system, and they are then available for further evaluation. The measurement takes place in FIG. 3, in block 22.

Block 23 uses the compression travel as input signals, and calculates from them the variables Wank, Dwank and HoeGes.

Filtered roll angle Wank and roll velocity Dwank can be estimated from the difference from side to side of the compression travel, and from the sum, vehicle level HoeGes can be estimated. In this context, the filtered roll angle is at a very close approximation proportional to the transverse acceleration. Using a fixed parameter $P_{ay}$, which depends on the roll stiffness of the vehicle, the filtered roll angle is recalculated to an equivalent transverse acceleration $a_{yw}$, and, correspondingly, the roll velocity is recalculated to the time derivative of the transverse acceleration characterized by $Da_{yw}$. This is done using the relationships $$a_{yw} = P_{ay} * Wank$$

and $$Da_{yw} = P_{ay} * DWank$$

The subscript "W" here indicating that variables derived from the filtered roll angle, not measured ones, are involved. Thus, $a_{yw}$ and $Da_{yw}$ replace the variables $a_y$ and $Da_y$.

The unfiltered roll angle WankRoh is here calculated by the following relationship:

$$WankRoh \approx \tan(WankRoh) \approx (HoeVR + HoeHR - HoeVL - HoeHL)/(2*wheelbase)$$

By filtering using a condition filter (Kalman) of the second order, the unfiltered value WankRoh is smoothed, and one thereby obtains the filtered roll angle Wank. Roll velocity Dwank is formed simultaneously by differentiation. This process may be formally shown by $$[Wank, Dwank] = \text{filter}(WankRoh).$$

Besides the roll angle, an estimated filtered height of center of gravity HoeGes may be calculated from the compression travel. This filtered height of center of gravity HoeGes refers to the same null point as the compression travel, and consequently represents a deviation of the absolute height of center of gravity from a reference height (which depends on the construction). One obtains an unfiltered unconditioned value HoeGesRoh of the height of center of gravity from the averaged compression travel:

$$HoeGesRoh = (HoeVR + HoeHR + HoeVL + HoeHL)/4.$$

Subsequently, the unconditioned value is smoothed using a filter of the first order, and one obtains the filtered height of center of gravity HoeGes:

$$HoeGes = PT1(HoeGesRoh).$$

Figure 6:
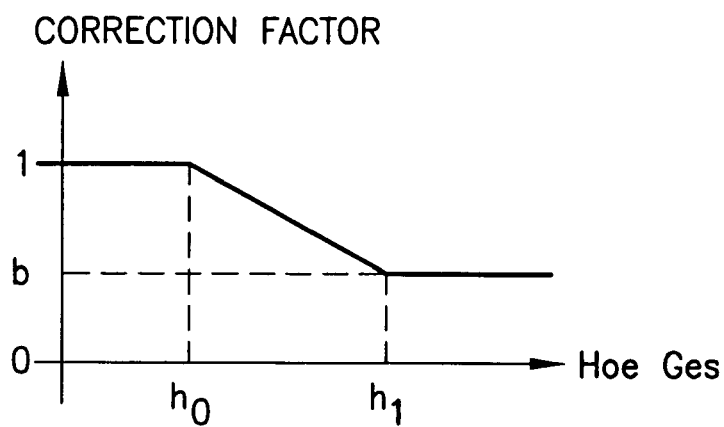
FIG. 6 shows a graph of a correction factor versus the height of the vehicle center of gravity (HoeGes).

Knowing the HoeGes value permits one to form a correction factor by which the transverse acceleration threshold $a_{ymax}$ is corrected by multiplying. An example pattern of this correction factor as a function of HoeGes is shown in FIG. 6. It is to be understood that this characteristics curve may also look substantially different. For small values of HoeGes (HoeGes<$h_0$) the correction factor has the value 1. That means that the transverse acceleration threshold $a_{ymax}$ is not corrected. For greater values of HoeGes, this corresponding to a high center of gravity of the vehicle, the correction factor becomes smaller. Consequently, an earlier intervention of the ROP logic in the driving dynamics takes place.

Parameters b, $h_0$ and $h_1$ permit an extensive adaptation of the characteristics curve, for instance, to the vehicle type.

The compression travel may also be drawn upon for accuracy monitoring or sensitivity monitoring of the yaw rate sensor. Then the variable $a_{yw}$, calculated from the compression travel, is not used instead of the measured transverse acceleration $a_{yw}$ but for monitoring the sensitivity of the transverse acceleration signal. In stationary driving scenarios, e.g., scenarios characterized by small changes in the transverse acceleration, the signals are compared, and, in case of deviations, a correction factor for the transverse acceleration is calculated from these.

In a further example embodiment, the following monitoring is employed:

if the signals $a_{yw}$ and $a_{yw}$ agree closely, the $y_{aw}$ rate sensor is assumed to be sufficiently accurate.

if the signals $a_{yw}$ and $a_{yw}$ do not agree closely, a sufficient accuracy of the output signal of the yaw rate sensor is not ensured. In this case the ROP logic is switched off.

The scenario recognition may also be broadened and improved, in that, when calculating $a_{yeff}$, in addition to $a_y$ and $Da_y$, a component that is a function of the steering angle and the steering angle gradient is added in, which both at a great steering angle gradient and at a great steering angle allows the early reaching of the threshold $a_{ymax}$. This component that is dependent on the steering angle is limited in its effect in time.

Figure 7:
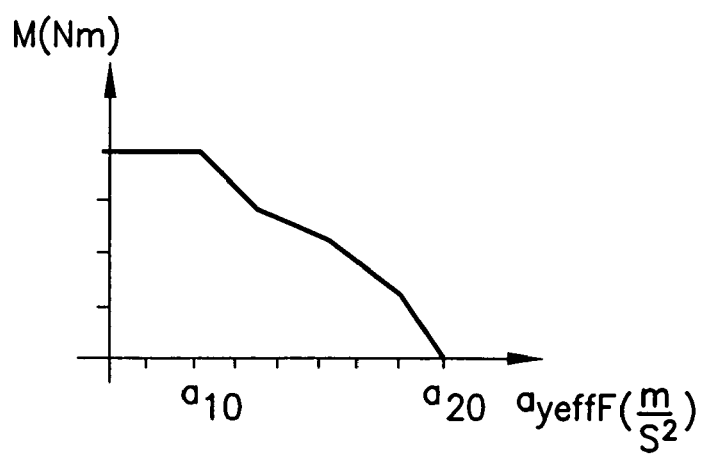
FIG. 7 shows a graph of a maximum permissible engine torque as a function of transverse acceleration.

It is emphasized that, as a function of the transverse acceleration, the drive torque may also be reduced outside an ASR regulation. As a result, an increase in speed and thus an increasing transverse acceleration can be avoided. In FIG. 7, the maximum possible engine torque M is plotted along the ordinate. Filtered effective transverse acceleration $a_{yeffF}$ is plotted along the abscissa. With regard to the filtering, a PT1 filtering using a low-pass filter of the first order may be employed. From $a_{yeffF}=0$ to switch-on threshold $a_{yeffF}=a_{10}$ no reduction in the maximum possible engine torque takes place. The value of $a_{10}$ may amount to 5 m/s², for example.

Between $a_{yeffF}=a_{10}$ and $a_{yeffF}$ and $a_{20}$ the maximum possible engine torque is reversed. At $a_{yeffF}=a_{20}$, the total reduction has occurred, i.e., the engine torque disappears completely and the driver is no longer able to accelerate. A reasonable value of $a_{20}$ may have an order of magnitude of 10 m/s². It is conceivable that one might correlate the values $a_{10}$ and $a_{20}$ with the values $a_0$ and $a_1$ (see FIG. 4). For example, the selection $a_{10}=a_0$ and $a_{20}=a_1$ is possible. If, in a diagram, the variable KoKipp is plotted along the abscissa, and the maximum possible engine torque is again plotted along the ordinate, this yields a qualitatively similar curve to FIG. 7. This is connected with the close dovetailing of KoKipp and $a_{yeffF}$. Therefore the maximum possible engine torque may also be reduced with a growing value of KoKipp.

What is claimed is:

1. A device for detecting and rectifying a danger of a rollover of a vehicle about an axis oriented in a longitudinal direction of the vehicle, the device comprising:
   a plurality of actuators and driver information systems;
   an arrangement configured to determine a variable describing transverse dynamics of the vehicle;
   an arrangement configured to compare the variable describing the transverse dynamics of the vehicle with at least one characteristic threshold value; and
   a regulating system configured to output signals for controlling the actuators;
   wherein, the regulating system is configured to perform the following if the variable describing the transverse dynamics of the vehicle is equal or greater than the characteristic threshold value:
   a) restrict certain sets of possible combinations of output signal values and prevent the output signals from being transmitted to the plurality of actuators; and
   b) activate at least one intervention for stability of the vehicle, the at least one intervention having an intensity that increases with an increasing value of the variable describing the transverse dynamics such that at least three intensity stages of the at least one intervention occur, a reduction of a maximum possible engine torque occurring in with the increase in the variable describing the transverse dynamics.

2. The device as recited in claim 1, wherein the regulating system is configured to perform restriction of the sets of possible combinations of output signal values and to prevent the activation of at least one possible intervention for a stability regulation of a performance of the vehicle.

3. The device as recited in claim 1, wherein the regulating system includes a driving dynamics regulation system.

4. The device as recited in claim 1, wherein the regulating system is configured to calculate a transverse acceleration of the vehicle and a change over time of the transverse acceleration in determining the variable describing the transverse dynamics of the vehicle.

5. The device as recited in claim 1, wherein the regulating system is configured to perform a low-pass filtration on the variable describing the transverse dynamics of the vehicle.

6. The device as recited in claim 1, wherein the regulating system is configured to determine the variable describing the transverse dynamics of the vehicle using at least one variable that characterize relative distances between at least one wheel unit and an automotive body of the vehicle.

7. The device as recited in claim 6, wherein the regulating system is configured to calculate a transverse acceleration and a change in time of the transverse acceleration from the at least one variable that characterizes the relative distances between the at least one wheel unit and the automotive body.

8. The device as recited in claim 4, wherein, if the case variable describing the transverse dynamics of the vehicle is equal to or greater than the characteristic threshold value, the regulating system is configured to prevent activation of at least one of the following interventions:
   a) all interventions against understeering;
   b) reduction of a braking effect at a front wheel on an outside of a curve; and
   c) brake applications that reduce a drive slip at the front wheel on an inside of the curve.

9. A method of detecting and rectifying a danger of a rollover of a vehicle about an axis oriented in a longitudinal direction of the vehicle, the method comprising:
   controlling output signals for a driver information system and a plurality of actuators;
   determining a variable describing transverse dynamics of the vehicle;
   comparing the variable describing the transverse dynamics of the vehicle with at least one characteristic threshold value; and
   if the variable describing the transverse dynamics of the vehicle is equal to or greater than the characteristic threshold value:
   a) preventing certain sets of combinations of output signal values from being transmitted to the driver information system or the plurality of actuators; and
   b) activating at least one intervention for the stability regulation of the vehicle performance of the vehicle, the at least one intervention having an intensity that increases with an increasing value of the variable describing the transverse dynamics of the vehicle such that at least three intensity stages of the at least one intervention may be distinguished;
   c) reducing a maximum possible engine torque with the increase in the variable describing the transverse dynamics of the vehicle.

* * * * *